United States Patent Office 3,711,443
Patented Jan. 16, 1973

3,711,443
LINEAR SEGMENTED POLYURETHANE ELASTOMERS
Wilhelm Thoma, Bergisch-Neukirchen, Harald Oertel, Odenthal-Gloebusch, and Heinrich Rinke, Leverkusen, Germany, assignors to Farbenfabriken Bayer Aktiengesellschaft, Leverkusen, Germany
No Drawing. Filed Apr. 7, 1971, Ser. No. 132,159
Claims priority, application Germany, Apr. 13, 1970,
P 20 17 510.4
Int. Cl. C08g 22/16, 51/44, 51/46
U.S. Cl. 260—75 NH
4 Claims

ABSTRACT OF THE DISCLOSURE

Linear segmented polyurethane elastomers obtained by reaction of NCO-prepolymers with chain extending agents in polar organic solvents, at least 55 mol percent of said chain extending agents being a compound of the formula

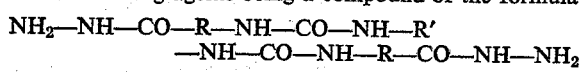

---

This invention relates to highly elastic, linear segmented polyurethanes (preferably in the form of highly elastic filaments) containing segments derivating from bis-urea dihydrazides as chain extenders, and to a process for the production of these polyurethanes.

It is known that substantially linear relatively high molecular weight NCO prepolymers obtained from relatively high molecular weight polyhydroxy compounds (optionally containing fairly small quantities of low molecular weight diols) and excess molar quantities of organic diisocyanates can be reacted in highly polar organic solvents such as dimethyl formamide with substantially bifunctional chain extenders containing two active hydrogen atoms, to form viscous solutions of substantially linear polyurethane elastomers which can be processed from the solution either into elastic filaments or into films. Diamines, preferably aliphatic or araliphatic diamines, hydrazine or dihydrazide compounds, are particularly suitable for use as chain extenders. Diamines and hydrazine show a very high level of reactivity towards the NCO prepolymers which preferably contain aromatically bound NCO groups, with the result that there is a danger of non-homogeneous, crosslinked portions ("jellyfish") being formed in the elastomer solution. A number of chemical modifications or expensive apparatus are required for reducing this tendency towards crosslinking.

By contrast, dihydrazide compounds used as chain extenders (cf. German Pat. No. 1,123,467) show a reactivity towards NCO prepolymers reduced to such an extent that their reaction can be controlled particularly effectively without any danger of the solution undergoing undesirable chemical crosslinking, accompanied by the formation of "jellyfish." Polyurethane elastomer solutions of this kind can be spun into highly elastic filaments which exhibit an outstanding tensile strength and limited permanent elongation. Unfortunately, it has been found that, under an initial load, elastomeric filaments of this kind undergo elongation to a much greater extent in hot air than in air at room temperature, and following relaxation, show excessive residual elongation. Also after hydrothermal treatment (for example in boiling water) of, in particular, pre-tensioned elastomeric filaments (for example at 100% elongation) the level of residual elongation is very high. The limited resistance of these dihydrazide-extended elastomeric filaments, chain-extended, for example, with the dihydrazides of adipic acid, terephthalic acid, isophthalic acid, 1,4-phenylene diacetic acid or 4,4'-diphenyl ether dicarboxylic acid, to elongation under thermal or hydrothermal conditions is particularly undesirable in finishing and dyeing processes.

Furthermore, elastomeric filaments of this kind, for example in cases where carbodihydrazide is used as a chain extender, react under the effect of traces of certain metal ions (for example $Cu^{++}$ or $Mg^{++}$) and, in doing so, are discoloured which detrimentally affects the appearance of the undyed fabrics although their strength properties are not affected in any way.

If bis-semicarbazides, for example 1,2-ethylene bis-semicarbazide or 1,4-tetramethylene bis-semicarbazide, are used instead of the dihydrazides as chain extenders for the reaction with the NCO prepolymers, the solubility of these bis-semicarbazides is highly unfavourable so that, depending upon their structure, they can even remain partly undissolved in boiling dimethyl formamide. In addition, it is not possible to obtain elastomer solutions which can be spun on an industrial scale because the solutions are converted into a gel-like form either during their preparation or after a short time. The polyurethane elastomers formed are probably inadequately solvated by the solvent and for this reason are precipitated in the form of a pasty gel which is impossible or extremely difficult to convert into filaments or films. It is only by adding relatively large quantities of salts, such as LiCl, $CaCl_2$ or $CaBr_2$, that it is possible to obtain solutions at elevated temperatures. Unfortunately, the addition of such salts adversely affects the spinning properties of the solutions.

Alkylene bis-carbazine esters have also been proposed as chain extenders for polyurethanes. Unfortunately, polyurethanes of this kind chain-extended with alkylene bis-carbazide esters show relatively low melting points and filaments spun from chain-extended polyurethanes such as these show highly unsatisfactory (hydro)thermal behaviour, in other words they undergo considerable elongation under a load at elevated temperature and especially under load in hot water and, following relaxation, they show excessive residual elongations. In addition, a considerable decrease in tension occurs in hot water where filaments or fabrics are kept at certain elongations. In many cases, the filaments actually break under test conditions in hot water. This behaviour of the corresponding elastomeric filaments is a serious disadvantage in cases where corresponding fabrics are treated under tension in hot water or steam in finishing and dyeing processes.

It is an object of this invention to provide linear segmented polyurethanes that do not show the disadvantages mentioned above.

This object is accomplished by a linear segmented polyurethane elastomer consisting of the reaction product of a relatively high molecular weight diisocyanates with chain extenders containing at least 55%, based on the total number of chain extending segments present, of a chain extending segment with the structure:

—NH—CO—NH—NH—CO—R—NH—CO—NH—R'
—NH—CO—NH—R—CO—NH—NH—CO—NH     (I)

in which

R represents

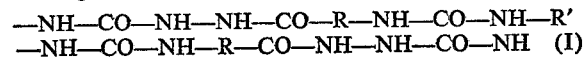

R' represents

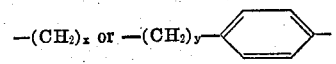

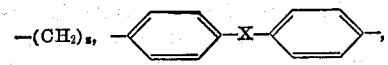

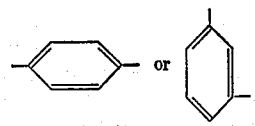

$x$ represents 1 or 2,
$y$ represents 0, 1 or 2, z represents 2 or 6, and
X represents —CH₂—, —(CH₂)₂— or —O—.

A polyurethane of this kind can be obtained by reacting the relatively high molecular weight isocyanate prepolymer with a substantially equivalent quantity of a bis-urea dihydrazide of Formula II:

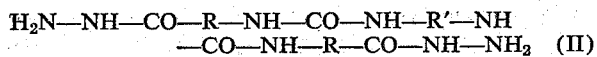

in which R and R' are as defined above in a highly polar organic solvent, and removing the solvent by evaporation or coagulation.

Accordingly, the end products are linear, segmented polyurethane elastomers consisting of the reaction product of a relatively high molecular weight diisocyanate with a chain extender containing chain-extending segments with the structure:

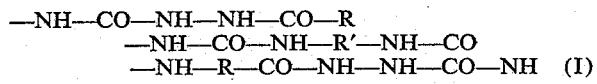

In addition to the bis-urea dihydrazides, it is possible to use other bifunctional chain extenders.

At least 55 mol percent of the chain extenders required for the chain-extending reaction with the NCO prepolymer are formed by the bis-urea dihydrazides. Accordingly, the corresponding elastomers contain at least 55%, based on the total number of chain-extending segments present, of segments with the following structure:

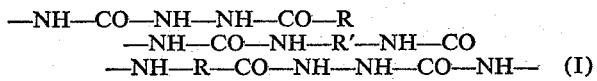

In view of the known properties, especially the thermal and hydrothermal properties, of elastomers obtained from dihydrazides, for example from dihydrazides of adipic acid, terephthalic acid, isophthalic acid, 1,4-phenylene diacetic acid or 4,4'-diphenyl ether dicarboxylic acid, as chain extenders, it was extremely surprising that bis-urea dihydrazides corresponding to the formula:

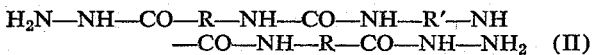

(formal insertion of two urea radicals into the hitherto used dihydrazides) should give elastomers with favourable properties which overall are considerably superior to those of comparable elastomers with dihydrazides without any urea groups in the molecule.

The solubility of the bis-urea dihydrazides in highly polar solvents is also high enough to carry out a normal chain-extending reaction.

Polyurethane elastomers obtained with diphenyl methane-4,4'-bis-(urea acetic acid hydrazide) and, diphenyl ether-4,4'-bis-(urea acetic acid hydrazide) as the chain extender, show particularly outstanding properties, so that they are preferably used as the bifunctional compound containing two active hydrogen atoms for chain extension of the NCO prepolymers, especially in cases where the polyurethanes are to be converted into elastomeric filaments. After the solution has been wet or dry spun in the usual way, elastomers of this kind give high grade elastomeric filaments with considerably improved thermal and hydrothermal properties coupled with outstanding strength and elastic properties. The filaments and films do not show any discoloration under the effect of heavy metals, for example copper ions, and show a higher resistance to hydrolysis than comparable dihydrazide compounds. Furthermore, the polyurethane elastomers are highly soluble in the usual solvents, such as, for example, dimethyl formamide, dimethyl acetamide, dimethyl sulphoxide or N-methyl pyrrolidone.

The bis-urea hydrazides used as chain extenders in accordance with the invention are novel compounds, examples including diphenylmethane-4,4'-bis-(urea acetic acid hydrazide),
diphenylmethane-4,4'-bis(urea propionic acid hydrazide),
diphenylmethane-4,4'-bis-(urea-p-phenylene acetic acid hydrazide),
diphenylmethane-4,4'-bis-(urea-p-phenylene propionic acid hydrazide),
diphenylethyl-4,4'-bis-(urea acetic acid hydrazide),
1,4-phenylene-bis-(urea acetic acid hydrazide),
1,3-phenylene-bis-(urea acetic acid hydrazide),
1,3-xylylene-bis-(urea acetic acid hydrazide),
diphenylethane-4,4'-bis-(urea acetic acid hydrazide),
ethylene-bis-(urea acetic acid hydrazide),
1,3-phenylene-bis-(urea benzoic acid hydrazide),
2,6-tolylene-bis-(urea benzoic acid hydrazide)

either in the pure form or in admixture with the 2,4-isomer, diphenylmethane-4,4'-bis-(urea benzoic acid hydrazide) and hexamethylene-1,6-bis-(urea benzoic acid hydrazide).

Even minor modifications in the structure of the chain extenders used, for example in cases where diphenyl dimethylmethane-4,4'-bis-(urea acetic acid hydrazide), ethylene-bis-N,N'-(methyl urea diacetic acid hydrazide), $$H_2N-NH-CO-CH_2-NH-CO-N-(CH_2)_2-N-CO-NH-CH_2-CO-NH-NH_2$$
$$\qquad\qquad\qquad\qquad\qquad\quad\;\; CH_3 \qquad\qquad CH_3$$

1,2-propylene-bis-(urea acetic acid hydrazide), 1,4-cyclohexane-bis-(urea acetic acid hydrazide), 1,4-hexahydroxylylene-bis-(urea acetic acid hydrazide) are used, are sufficient to render the thermal and hydrothermal properties of the elastomers chain-extended with them inadequate.

The production of the elastomers with valuable properties remains restricted to the use of bis-urea dihydrazides of Formula II as chain extenders.

The novel chain extenders can be obtained, for example, by hydrazinolising the alkyl or aryl esters (methyl, ethyl or phenyl esters are preferred) of the corresponding bis-urea dicarboxylic acids in accordance with the following scheme:

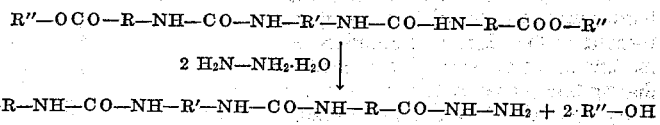

in which
R and R' are as defined above,
R''=—CH₃—, C₂H₅— or

The bis-urea dicarboxylic acids and their esters are obtained:

(a) from 2 mols of an aminocarboxylic acid or an ester thereof by reaction with 1 mol of diisocyanate, or
(b) from 2 mols of an isocyanato-carboxylic acid ester and 1 mol of a diamine.

To synthesize an elastomer, a substantially linear relatively high molecular weight NCO prepolymer obtained from a relatively high molecular weight polyhydroxy compound (optionally containing a relatively small quantity of a low molecular weight dihydroxy compound and excess diisocyanate) is reacted in a highly polar organic solvent with a substantially equivalent quantity of a bis-urea hydrazide as a chain extender, optionally in admixture with conventional chain extenders. The following processes, for example, represent the prinicple methods of obtaining elastomers containing the segment (I):

—NH—CO—NH—NH—CO—R—NH—CO—NH—R'
—NH—CO—NH—R—CO—NH—NH—CO—NH— which is formed by reacting the chain extender:

H$_2$H—NH—CO—R—NH—CO—NH—R'
—NH—CO—NH—R—CO—NH—NH$_2$ with the NCO groups of (relatively high molecular weight) diisocyanates:

$$O=C=N.Y.N=C=O$$

(a) Reacting the NCO prepolymer of a relatively high molecular weight dihydroxy compound with an excess molar quantity of a diisocyanate (NCO content of the prepolymer between 1% and 6% NCO, based on the solids content) with a substantially equivalent quantity of a bifunctional low molecular weight chain extender containing two active hydrogen atoms in the presence of a highly polar organic solvent, bis-urea dihydrazides of Formula II:

H$_2$N—NH—CO—R—NH—CO—NH
—R'—NH—CO—NH—R—CO—NH—NH$_2$ in which R and R' are as defined above, being used as the chain extenders;

(b) Same reaction as (a), except that in addition to at least 55 mol percent of the bis-urea dihydrazide of Formula II up to 45 mol percent of a conventional bifunctional compound with two active hydrogen atoms and a molecular weight of from 18 to 300 (for example water, hydrazine, aminoalcohols, diamines, dihydrazides, semicarbazide hydrazides, semicarbazide carbazine esters or semicarbazide amines) are also used as chain extenders;

(c) Reacting an isocyanate prepolymer containing approximately 1 to 6% by weight of NCO, obtained from (a) relatively high molecular weight dihydroxy compound, (b) a low molecular weight diol with preferably 1 or 2 tertiary amino groups in the molecule and with a molecular weight of from 62 to 300, in a quantity of from 0.05 to 1.0 mol per mol of the relatively high molecular weight dihydroxy compound, and (c) an excess molar quantity of diisocyanate, with a substantially equivalent quantity of a bis-urea dihydrazide of Formula II:

H$_2$N—NH—CO—R—NH—CO—NH—R'
—NH—CO—NH—R—CO—NH—NH$_2$ as a chain extender in a highly polar solvent;

(d) Reacting an isocyanate prepolymer obtained as in method (c) with a substantially equivalent quantity of chain extenders, at least 55 mol percent of the bis-urea dihydrazide of Formula II and up to 45 mol percent of a conventional chain extender being used.

The products obtained by the process are linear segmented polyurethane elastomers consisting of characteristic intralinear segments with the idealised structure (III):

[(O—D—O—CO—NH—Y—NH—CO)$_r$
—(O—G—O—CO—NH—Y—NH—CO)$_s$]$_m$
—[—NH—NH—CO—R—NH—CO—NH—R'—NH
—CO—NH—R—CO—NH—NH—CO—NH—Y
—NH—CO—]$_n$ in which D represents a long-chain divalent substantially aliphatic polymer radical of a relatively high molecular weight polyhydroxy compound with a melting point below 60° C. and a molecular weight of 500 to 6000 without the terminal hydroxyl groups and without any substituents reactive to isocyanate;

Y represents a divalent organic radical of an aromatic, aliphatic, cycloaliphatic or araliphatic diisocyanate;

G represents a divalent aliphatic, cycloaliphatic or araliphatic radical of a dialcohol with a molecular weight of from 62 to 300, preferably containing one or more tertiary aliphatic amino groups, without the terminal hydroxyl groups;

R and R' are as just defined;

$r$ is an integer of at least 1, for example from 1 to 5, preferably from 1 to 3;

$s$ is 0 or an integer of at least 1, for example from 1 to 5, preferably from 1 to 3; and $n$ is 1 to 5, preferably 1 or 2.

These elastomers show a breaking elongation in excess of 300% and an inherent viscosity (measured in a 1% solution in hexamethyl phosphoramide at 25° C.) of at least 0.5, which are sufficient to give adequate elasticity properties in the filaments and films.

In addition to structural segments of Formula III, up to a maximum of 45% by weight of the substantially linear segmented polyurethane elastomers can consist of intralinear segments which are formed by reacting the NCO prepolymers with conventional chain extenders such as water, aminoalcohols or compounds containing two terminal NH$_2$ groups, and which have the following structure (IV):

—[—(O—D—O—CO—NH—Y—NH—CO)$_r$
—(O—G—O—CO—NH—Y—NH—CO)$_s$—]$_m$
—[—(NH—Z—NH—CO)$_p$—NH—Y—NH—CO—]$_n$ in which D, G, Y, R, $s$, $m$ and $n$ are as defined above, $p$ is 0 or 1, and Z represents the radical of a conventional chain extender with two terminal NH$_2$ groups H$_2$N—Z—NH$_2$ without these NH$_2$ groups. Z can represent a single bond or a divalent organic radical, preferably with 2 to 13 carbon atoms, without any substituents which react with isocyanates, for example a divalent aliphatic or cycloaliphatic radical with a maximum of 13 carbon atoms, preferably the $$-CH_2-CH-(R'=H, CH_3), -(CH_2)_3-N\begin{pmatrix}CH_2-CH_2-N\\|\\H_3C\end{pmatrix}_y-(CH_2)_3-$$
$$\overset{|}{R'} \qquad \overset{|}{CH_3}$$
(y=0, 1)

$$-(CH_2)_3-N\overset{R'}{\underset{R'}{\diagdown}}N-(CH_2)_3-$$

cis/trans mixture or cis/trans

CH$_2$—CH$_2$
CH$_2$     CH-radical
CH—CH$_2$ a divalent aromatic radical without any condensed rings, preferably a —⟨⟩—X—⟨⟩—radical in which X represents a single bond or

—O—, —CH$_2$—, —CH$_2$—CH$_2$—

$$-\overset{CH_3}{\underset{CH_3}{\overset{|}{C}}}-$$

a divalent araliphatic radical, preferably a 1-, 3- or

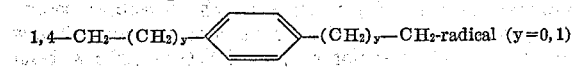 (y=0,1)

or a radical —HN—CO—R"—CO—NH—,

—HN—CO—NH—R"—NH—CO—NH— in which
R" represents a divalent organic radical with up to 13 carbon atoms, for example an aliphatic, cycloaliphatic or aromatic radical, preferably a

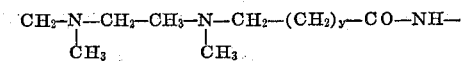

or

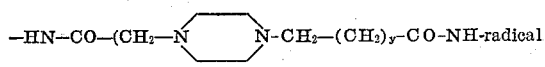

also the radical —HN—CO—(CH$_2$)$_2$—NH—CO—NH— or —NH—CO—O—CH$_2$—CH$_2$—NH—CO—NH—.

Examples of suitable relatively high molecular weight substantially linear polyhydroxyl compounds with terminal hydroxyl groups of the formula HO—D—OH include polyesters, polyester amides, polyethers, polyacetals, polycarbonates or poly-N-alkyl urethanes (these compounds may optionally contain other groups such as ester, ether, amide, urethane or N-alkyl urethane groups) with molecular weights of from 500 to 6000, preferably from 800 to 3000, and melting points of preferably below 60° C., preferably below 45° C. It is also possible to employ mixtures of such relatively high molecular weight polyhydroxyl compounds.

Particular reference is made to the use of polyesters of adipic acid and dialcohols (optionally mixtures of dialcohols), for example ethylene glycol, propylene glycol, 1,4-butane diol, 2,5-hexane diol, 2,2-dimethyl-1,3-propane diol, 1,6-hexane diol, 2-methyl-1,6-hexane diol, 2,2-dimethyl-1,3-hexane diol, p-bis-hydroxymethyl cyclohexane, 3-methyl-1,4-pentane diol and 2,2-diethyl-1,3-propane diol, preferably those with diols or mixtures of diols containing at least 5 carbon atoms because polyesters of this show relatively high resistance to hydrolysis and also an outstanding low-temperature elasticity in the end products, especially in cases where diols containing lateral alkyl radicals are used. Polyesters obtained by the polyaddition of caprolactone to amines or glycols with a narrow molecular weight distribution, also represent suitable starting materials.

Polyurethane elastomers with an outstanding resistance to hydrolysis can be obtained from polyalkylene ethers such as polytrimethylene ether diols and polypropylene glycols, but preferably from polytetramethylene ether diols which may optionally also be used in the form of mixed polyethers (by cocondensing in small quantities epoxides such as propylene oxide or epichlorhydrin) or following terminal group modification, for example by replacing the OH groups with the —O—CO—N—(alkyl)—CH$_2$CH$_2$—OH group. Polyepichlorhydrins with terminal OH groups in the aforementioned molecular weight range are also suitable for non-inflammable products. Basic polyethers with tertiary amino groups which can be quaternised (optionally in part) are also suitable.

Suitable polycarbonates include those containing 1,6-hexane diol as the sole or predominating dialcohol in addition to other diols, or those obtained from ω-hydroxy-caproic acid-ω'-hydroxyhexyl ester.

Aliphatic, cycloaliphatic, araliphatic, aromatic and heterocyclic diisocyanates, optionally in admixture with one another, may be used as the diisocyanates of the general formula:

O=C=N—Y—N=C=O

Particular reference is made to aromatic diisocyanates with a symmetrical structure, for example diphenylmethane-4,4'-diisocyanate, diphenyl dimethylmethane-4,4'-diisocyanate, phenylene-1,4-diisocyanate, 2,2'-, 6,6'-tetramethyl diphenylmethane-4,4'-diisocyanate, diphenyl-4,4'-diisocyanate, diphenyl ether-4,4'-diisocyanate or their alkyl-, alkoxyl- or halogen-substituted derivatives, also tolylene-2,4- and -2,6-diisocyanate or their commercial mixtures, 2,4-diisopropyl phenylene-1,3-diisocyanate, m-xylylene diisocyanate, p-xylylene diisocyanate and α,α,α',α'-tetramethyl-p-xylylene diisocyanate, also alkyl- or halogen-substitution products of the above diisocyanates, for example 2,5-dichloro-p-xylylene diisocyanate or tetrachloro-p-phenylene diisocyanate, dimeric tolylene-2,4-diisocyanate or bis-(3-methyl-4-isocyanato-phenyl)-urea. Aliphatic diisocyanates such as hexane-1,6-diisocyanate, cyclohexane, 1,4-diisocyanate, dicyclohexylmethane-4,4'-diisocyanate, 1-isocyanato-3-isocyanato-methyl-3,5,5-trimethyl cyclohexane or 2,2,4-trimethyl hexane-1,6-diisocyanate, can be used, optionally proportionately, and these yield products which undergo little or no discoloration on exposure to light. Such diisocyanates as ω,ω'-di-(isocyanato-ethyl)-benzene or 1,2,3,4,5,6 - hexahydrodiphenylmethane-4,4'-diisocyanate also give products which undergo little or no discoloration on exposure to light.

By virtue of their ready availability, it is preferred to use diphenylmethane-4,4'-diisocyanate, diphenyl ether-4,4'-diisocyanate, p-phenylene diisocyanate, the isomeric tolylene diisocyanates and (optionally proportionally) hexane-1,6-diisocyanate and the cis/cis- and/or cis/trans- and/or trans/trans-isomers of dicyclohexyl methane-4,4'-diisocyanate.

To prepare the substantially linear relatively high molecular weight isocyanate prepolymers, one of the aforementioned readily high molecular weight polyhydroxyl compounds of the formula HO—D—OH is reacted with a diisocyanate in an excess molar quantity, for example in a molar ratio of from 1:1.25 to 1:4.0, and preferably in a molar ratio of from 1:1.30 to 1:2.5, the diisocyanates optionally being added in stages, either in the melt or in such solvents as tetrahydrofuran, dioxane, ethyl acetate, 2-butanone, chlorobenzene or dimethyl formamide, at a temperature of up to about 130° C., preferably 70 to 100° C. Temperatures of from 20 to 70° C. are preferred when dimethyl formamide is used as the reaction medium. In cases where the relatively high molecular weight hydroxyl compounds have fairly low molecular weights, for example in the range from 650 to 1250, the diisocyanates are preferably reacted in lower molar ratios, for example from 1:1.25 to 1:2.0 and, where they have relatively high molecular weights, for example from 1500 to 2500, preferably in relatively high molar ratios of, for example, from 1:1.5 to 1:2.5.

In cases where a polyhydroxyl compound of the formula HO—D—OH is reacted with a diisocyanate of the formula OCN—Y—NCO in a molar ratio of 1:2, an NCO prepolymer with the idealised structure:

OCN—Y—NH—CO—O—D—O—CO—NH—Y—NCO is formed. Where the reaction is carried out in a molar ratio of 1:1.5 (=2:3), an NCO prepolymer with the general structure:

OCN—Y—NH—CO—O—D—O—CO—NH—Y—
            NH—CO—O—D—O—CO—NH—Y—NCO is formed. Structures of the same formula are formed in cases where the polyhydroxyl compounds are first reacted in an OH:NCO ratio of 2:1, and the pre-extended dihydroxy compound thus obtained subsequently converted, optionally with another diisocyanate, in an

OH:NCO ratio of 1:2 into the isocyanate prepolymer. Corresponding statistical mixtures of corresponding NCO prepolymers can be obtained with other molar ratios.

In the preparation of the isocyanate prepolymers, it is also possible to use relatively small quantities of low molecular weight diols of the formula HO—G—OH with molecular weights of from 62 to about 300, especially those containing one or more tertiary amino groups, in addition to the relatively high molecular weight polyhydroxyl compounds of the formula HO—D—OH, in the reaction with the diisocyanates. The diols can be added in admixture with the relatively high molecular weight polyhydroxyl compounds or at any time during or after NCO prepolymer formation from diisocyanates and relatively high molecular weight polyhydroxyl compounds. Examples of these diols include ethylene glycol, 1,4-butane diol, bis-N,N-(β-hydroxy ethyl)-methylamine, bis - N,N - (β - hydroxy propyl) - methylamine, N,N'-dimethyl - N,N' - bis - (β - hydroxy ethyl) - ethylene diamine, N,N'-dimethyl - N,N' - bis - (β - hydroxy propyl)-ethylene diamine, N,N' - bis - (β - hydroxy propyl)-piperazine, N,N' - bis - (β - hydroxy ethyl) - piperazine or hydroquinone - bis - (β - hydroxy ethyl ether). The use of diols with tertiary amino groups increases affinity for dyes, improves resistance to light and provides the starting point for further after-treatments, for example crosslinking with 4,4'-bis-chloromethyl diphenyl ether.

The low molecular weight diols are generally used in quantities of from 0.05 to 1.0 mol, preferably in quantities of from 0.05 to 0.5 mol and more preferably in quantities of from 0.07 to 0.25 mol, per mol of the polyhydroxyl compound in the formation of the NCO prepolymer. In these cases, the quantity of diisocyanates used is best increased beyond the molar ratios just mentioned by the quantity corresponding to the low molecular weight diols, for example by 0.05 to 1.0 mol. This results in the formation of isocyanate prepolymers with the structure:

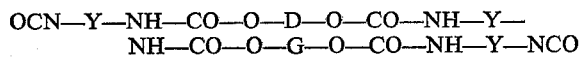

or in the case of "pre-extension," in the formation of an NCO prepolymer with the structure:

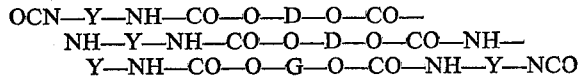

The typical structural segments of the isocyanate prepolymers (which can also be referred to as "relatively high molecular weight diisocyanates"), which arise out of "pre-extension" or glycol incorporation, are formed in a more or less statistical sequence and may optionally occur repeatedly. The NCO group content of the isocyanate prepolymers (expressed as percent by weight of NCO in the solvent-free NCO prepolymer) is of crucial importance to the properties of the polyurethane elastomers obtained from them. Basically, it is only those NCO prepolymers which have an NCO content of at least 1.0% in the solids component which are suitable for reaction with the bis-urea dihydrazides used as chain extenders in accordance with the invention. The isocyanate prepolymers should preferably have an NCO content of from 1.5 to 6% by weight. NCO contents of from 1.75 to 3.5%, based on the solids content of the isocyanate prepolymer, are particularly preferred in cases where the elastomers obtained from them are to be used in the production of elastomeric filaments.

Bis-urea dihydrazides of Formula II:

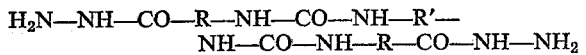

in which R and R' are as defined previously, are used preferably on their own but also in admixture, as the bifunctional chain extenders containing two active hydrogen atoms in substantially equivalent quantities, based on the NCO groups of the NCO prepolymer. Diphenylmethane-4,4'-bis-(urea acetic acid hydrazide) and diphenyl ether-4,4'-bis-(urea acetic acid hydrazide) are particularly preferred.

However, in addition to at least 55 mol percent of the bis-urea dihydrazides, it is also possible to use up to 45 mol percent of other conventional chain extenders with molecular weights of from 18 to about 300, such as water, glycols or those of the formula $H_2N$—Z—$NH_2$, in which Z is as previously defined. Examples of conventional chain extenders include water, aminoalcohols, such as aminoethanol, and organic compounds with two terminal $NH_2$ groups, for example hydrazine (or hydrazine hydrate), aliphatic diamines, preferably ethylene diamine, 1,2-propylene diamine, cis- and/or trans - 1,3 - diamine cyclohexane, N,N - bis - (γ - aminopropyl)methylamine, N,N'-dimethyl - N,N' - bis - (γ - aminopropyl)-ethylene diamine, N,N' - bis - (γ - aminopropyl) - piperazine, N,N'-bis - (γ - aminopropyl) - 2,5 - dimethyl piperazine, aromatic diamines, preferably 4,4' - diamino diphenylmethane, 4,4' - diamino diphenyl ether, 4,4'-diamino diphenylethane, 4,4'-diamino diphenyl dimethylmethane and araliphatic diamines such as m- and p-xylene diamine, 1,4 - bis - (β - aminoethyl) - benzene and α,α,α',α'-tetramethyl-p-xylylene diamine and dihydrazides, bis-semicarbazides and bis-carbazine esters such as carbodihydrazide, terephthalic acid dihydrazide, hydroquinone diacetic acid dihydrazide, amino acetic acid hydrazide, methylamino-N,N - bis - (propionic acid hydrazide), piperazine-N,N'-bis-(propionic acid hydrazide), N,N-dimethyl ethylene diamine - N,N' - bis - (propionic acid hydrazide) and semicarbazido propionic acid hydrazide according to Belgian Pat. No. 734 194.

The reactions can also be carried out with stagewise chain extension or with a mixture of the chain extenders.

In order to reduce the molecular weight and to obtain polyurethane elastomers which are still soluble despite any molecular branching which may have occurred, it is also possible to use small quantities, for example from 0.01 to 10 mol percent, based on the NCO content, of a monofunctional compound for the chain-terminating reactions, for example butylamine, dibutylamine, acethydrazide, butyl-semicarbazide, N,N-dimethyl hydrazide and 1-butanol.

Reaction of the isocyanate prepolymer with the chain extending agent is preferably carried out with a substantially equivalent quantity (based on the NCO content), for example from 100 to 120%, preferably from 100 to 110 mol percent, of the chain extender, preferably at a temperature of from 0 to 130° C., advantageously from 20 to 80° C., in the presence of a solvent. The higher the excess of the chain extender, the lower will be the molecular weight of the polyurethane due to chain termination. It is possible by carefully adding other aliphatic diisocyanates or triisocyanates which are preferably less reactive to adjust the required molecular weight and solution viscosity (in accordance with German patent specification No. 1,157,386). After the required viscosity has been reached, the unreacted terminal groups can be stabilised by reacting with a monoisocyanate, such as butyl isocyanate, a carboxylic acid anhydride, for example acetanhydride, phthalic acid anhydride or another substance with an acylating effect, for example an acid chloride or a carbamic acid chloride.

Suitable solvents include highly polar organic watersoluble solvents, preferably with boiling points of from 140 to 225° C., which contain amide, urea or sulphoxide groups and which are capable of forming strong hydrogen bridging bonds, such as dimethyl formamide, diethyl formamide, formamide, dimethyl acetamide, formyl morpholine, hexamethyl phosphoramide, tetramethyl urea, dimethyl sulphoxide, dimethyl cyanamide or a mixture thereof. Dimethyl formamide and dimethyl acetamide represent commercially preferred solvents. Less polar solvents which on their own are unable to dissolve the polyurethanes or polyurethane ureas, can be added to the highly polar solvents in certain quantities, for example in a quantity of up to substantially 33% by weight of the total quantity of the solvent. Examples of these less polar solvents include tetrahydrofurane, dioxane, acetone, glycol monomethyl ether acetate and chlorobenzene. The elastomer solutions should have a concentration of from 5 to 43% by weight, preferably from 10 to 33% by weight and more preferably from 15 to 28% by weight, with a viscosity of from 1 to 1000 poises and preferably from 50 to 800 poises at 20° C. The molecular weight of the segmented elastomers according to the invention should be so high that the inherent viscosities $$\eta_i = \frac{\ln \eta_{rel}}{c}$$

measured at 25° C. amount to at least 0.5 and preferably to from 0.7 to 1.9 when 1.0 g. of elastomer is kept dissolved in 100 ml. of hexamethyl phosphoramide solution (phosphoric acid tris-dimethyl amide) at 20° C. In the above equation, $\eta_{rel}$ is the relative viscosity (the ratio between the throughflow time of the solution and the throughflow time of the solvent) whilst $c$ is the concentration in g./100 ml. The elastomers should have melting points above 200° C. and preferably above 220° C. (as measured on a Kofler bench) in cases where they are to be used as starting materials for the production of elastomeric filaments.

The solutions of the polyurethane or polyurethane ureas can have added to them organic or inorganic pigments, dyes, optical brighteners, ultraviolet absorbers, phenolic anti-oxidants, especially light absorbers such as N,N-dialkyl semicarbazides or N,N-dialkyl hydrazides, and substances with a crosslinking effect such as paraformaldehyde, melamine hexamethylol ether and other formaldehyde derivatives such as dimethylol dihydroxy ethylene urea, dimethylol ethylene urea, trimethylol melamine, dimethylol urea dimethyl ether, quaternising agents, for example dichloromethyl durol, and polyaziride diureas, for example hexamethylene-ω,ω-bis-ethylene imide urea. Their resistance to dissolution and swelling in the presence of highly polar solvents is modified by a crosslinking reaction, for example a heat-initiated crosslinking reaction.

The solvent can be removed from the elastomer solutions by a variety of methods known per se including evaporation or coagulation, in some cases accompanied by formation of the required mouldings such as filaments or films. Films or coatings are obtained by drying the elastomer solution on substrates, for example glass plates or textile substrates. Filaments can be obtained by wet or dry spinning. Microporous coatings are obtained by brushing the elastomer solutions on to (optionally textile) substrates (for example webs), optionally in the presence of moist air, followed by coagulation in non-solvents for the polyurethane, for example water or an aqueous solution. The microporosity of the films can be further increased by suitable additives such as finely divided salts, emulsifiers or soluble polyamides.

In the following examples, temperatures are specified in ° C.

The films or filaments referred to in the examples were obtained and measured by the following standard processes:

Films: By brushing the elastomer solution onto glass plates and allowing it to dry (for 30 minutes at 70° C. and then for 45 minutes at 100° C.) to produce final thickness from 0.15 to 0.25 mm. Some filaments with a thickness of from 250 to 800 dtex were cut out of the films by means of a film-cutting machine and measured.

Wet spinning process: An elastomer solution, preferably 10%, is spun at a rate of about 1 ml. per minute through a 20-hole spinneret (bores 0.12 mm. in diameter) into a coagulating bath heated to 80 to 85° C. of a 90% by weight water/10% by weight dimethyl formamide (length approximately 3 m.), and wound up at a take off rate of 5 metres per minute after passing through a washing zone (water/90° C.). The packages are stored in boiling water (50° C.) for 1 hour and then dried.

Drying spinning process: An elastomer solution, preferably 24 to 26%, is spun through a 16-hole spinneret (bore diameter 0.20 mm.) into a shaft 5 metres long heated to 220 to 250° C. into which air heated to between 210 and 280° C. is blown. The filaments are run off at a rate of about 100 metres per minute and, following preparation with talcum suspension, optionally accompanied by stretching, are wound up, for example, at a rate of 125 to 175 metres per minute. The filaments can then be heat treated either on bobbins or in continuous form (the spinning rates can be even higher, for example from 300 to 400 metres per minute).

Breaking elongation is measured in a tensile testing machine. The distance between the grips is monitored by a light barrier, and the amount of slip duly compensated.

In order to characterise the elastic data, the modulus at 300% (in the first elongation curve), the modulus at 150% (in the third recovery curve) and the permanent elongation (after three times 300% elongation, 30 seconds after relaxation) are determined.

Determining the heat distortion temperature (HDT) of elastomer filaments:

The denier of elastomeric filaments laid out for some 3 hours under normal climatic conditions in the absence of tension is determined by weighing a length of the filament under an initial strain of 0.045 mg./dtex. An elastomeric filament is suspended at room temperature in a tube which contains air or is filled with nitrogen under an initial load of 1.8 mg./dtex, the distance between the grips being 250 mm. The tube is surrounded by a heating jacket through which flows thermostatically heated silicon oil. The temperature inside the tube is initially increased to about 125° C. over a period of some 30 minutes. Thereafter, the temperature is increased at a rate of 3° C. every 5 minutes until the elastomeric filament has undergone a change in length of more than 400 mm. The measurements obtained are graphically plotted so that on the abscissa one unit of length corresponds to a temperature difference of 10° C., whilst on the ordinate one unit of length corresponds to a change in length of the elastomeric filament of 20 mm. The heat distortion temperature (HDT) is the temperature read off by vertically projecting the point of contact of the 45° tangent to the temperature/length change curve on the abscissa.

In general, the resistance to heat of the elastomers can be more highly assessed, the higher the HDT value which is found. For high grade elastomeric filaments, the value should amount to at least 145° C. and preferably to higher than 150° C.

Determining the hot-water-induced decrease in tension (HWDT) of elastomeric filaments:

A length of filament held between grips 100 mm. apart (pre-tension load 0.9 mg./dtex) is stretched by 100% at a temperature of 20° C. and the tension (mg./dtex) produced in it after 2 minutes is measured (first value). The filament still stretched by 100% is then immersed in water heated to 95° C. and the tension reduced after a residence time of 3 minutes is measured (second value). After this measurement, the filament is removed from the water bath and left for 2 minutes at room temperature. The filament still held between the grips is then released until the tension is released and the permanent residual elongation is measured (third value).

Plan of reproduction in the examples (abbreviation HWDT):

| Modulus | | |
|---|---|---|
| 1st value | 2d value | 3d value |
| In air at 20° C. (mg./dtex). | In water at 95° C. (mg./dtex). | Residual elongation after relaxation in air at 20° C. (percent). |

The hydrothermal properties may be assessed more highly, the greater the second value (tension in hot water in mg./dtex) and the smaller the third value (residual elongation after treatment in the relaxed state). The strain value in water should be at least 13.5 mg./dtex and at least 18 mg./dtex in the case of high grade elastomeric filaments. After hydrothermal treatment, the residual elongation in the relaxed state should be less than 45% and preferably less than 40%.

Determining the hot water elongation (HWE) of elastomeric filaments:

A weight of 27 mm./dtex is attached by means of a clip to a 50 mm. long piece of the filament, and is left suspended in air for 25 minutes at room temperature. After 25 minutes, the percentage elongation found is determined (1st value). The filament thus elongated is then immediately immersed in water heated to 95° C. together with the weight attached to it and the elongation occurring in the water is read off after an interval of 25 minutes. It is expressed as a percentage elongation, based on the distance between grips 50 mm. apart (2nd value). The weighted filament is then removed from the hot water bath after which its permanent residual elongation is determined by lifting the weight until the filament is free from tension (3rd value).

Plan of reproduction in the examples (abbreviation HWE):

| Elongation | | |
|---|---|---|
| 1st value | 2d value | 3d value |
| In air at 20° C. (percent). | In water at 95° C. (percent). | Residual elongation after relaxation in air at 20° C. (percent). |

The hydrothermal properties may be assessed more highly, the smaller the second value (elongation in hot water) and the smaller the third value (permanent elongation after relaxation). For high grade elastomer filaments, the 2nd value should be less than 250% and preferably less than 150%, whilst the residual elongation (3rd value) should be less than 150% and preferably less than 100%.

The melting point of the elastomer substance is measured on a strip of film after it has been placed for a period of 2 minutes on a Kofler bench, and should be above 200° C. and with greater advantage above 230° C. for elastomeric filaments.

Preparation of the bis-urea dihydrazides:

(I) Diphenylmethane-4,4'-bis-(urea acetic acid hydrazide)

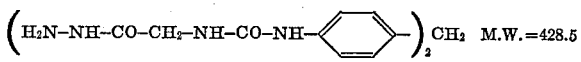

306 g. of diphenylmethane-4,4'-bis-(urea acetic acid ethyl ester) are dissolved in 1100 ml. of pyridine. 165 g. of hydrazine hydrate are added dropwise over a period of 20 minutes into the boiling solution of the bis-urea ester, and the reaction mixture is boiled for another 30 minutes. After cooling, the bis-urea dihydrazide is filtered off under suction, washed thoroughly with alcohol or methanol and dried. The substance can be recrystallised from 10 ml./g. of dimethyl formamide. The crude yield comprises 96% of the theoretical, M.P. 214° C.

$C_{19}H_{24}N_8O_4$ (428.5).—Calculated (percent): C, 53.26; H, 5.65; N, 26.15. Found (percent): C, 53.30; H, 5.80; N, 26.10.

280 g. of glycine ethyl ester hydrochloride are dissolved in 800 ml. of water at 15° C. 80 g. of caustic soda in 800 ml. of water are then added with cooling at 10 to 15° C. in order to liberate the amino acid ester. A solution of 230 g. of diphenylmethane-4,4'-diisocyanate and 720 ml. of benzene is added dropwise with thorough stirring, $t=15°$ C. The bis-urea ester is formed as a granular deposit which is filtered off under suction and washed thoroughly with water. The crude yield is 96 to 97% of the theoretical. The substance can be recrystallised from 2 ml./g. of toluene and 15 ml./g. of dimethyl formamide, M.P. 209° C.

$C_{23}H_{28}N_4O_6$ (456.5).—Calculated (percent): C, 60.52; H, 6.18%; N, 12.27. Found (percent): C, 60.80; H, 6.20; N, 12.30.

(II) Diphenylmethane-4,4'-bis-(urea propionic acid hydrazide)

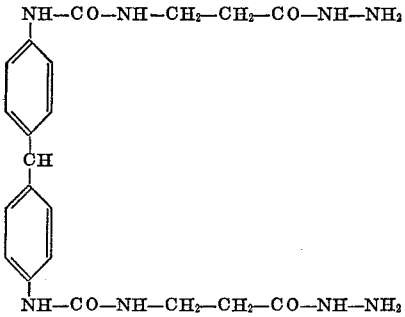

M.W.=456.5

55.0 g. of diphenylmethane-4,4'-bis-(urea propionic acid ethyl ester) are dissolved in 100 ml. of N-methyl pyrrolidone and 75 ml. of pyridine. 30 g. of hydrazine hydrate are added dropwise to the boiling solution, after which the solution is boiled for 90 minutes. After cooling with ice, the bis-urea dihydrazide is filtered off under suction and washed with alcohol; yield 95.3%, M.P. 222° C. $C_{21}H_{28}N_8O_4$ (456.5).

154 g. of β-alanine ethyl ester hydrochloride are dissolved in 700 ml. of water. A sodium hydroxide solution (40 g. of caustic soda in 400 ml. of water) is then added dropwise at 15° C. to liberate the amino acid ester. A solution of 215 g. of diphenylmethane-4,4'-diisocyanate in 360 ml. of benzene is run with thorough stirring into the aqueous solution of the amino ester. (Temperature=15° C.). The two-phase reaction mixture is stirred for 2 hours, the deposit is filtered off under suction and washed thoroughly with water. Diphenylmethane-4,4'-bis-(urea propionic acid ethyl ester) is obtained in a yield of 82%, M.P. 190° C.

$C_{25}H_{32}N_4O_6$ (484.6).—Calculated (percent): N, 11.56. Found (percent): N, 11.90.

(III) Diphenylmethane-4,4'-bis-(urea phenyl acetic acid hydrazide)

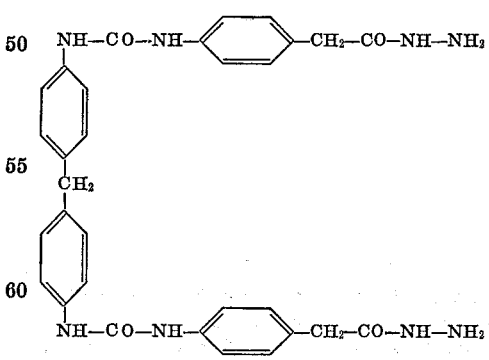

M.W.=580.7

40 g. of hydrazine hydrate are introduced into 50 ml. of pyridine at 100° C. A solution of 80.0 g. of diphenylmethane-4,4'-bis-(urea phenyl acetic acid methyl ester) in 150 ml. of N-methyl pyrrolidone is then added, and the reaction mixture kept at 110° C. for 90 minutes. After cooling, the bis-urea hydrazide which has crystallised out is filtered off under suction and washed with alcohol, yield =60%, M.P. 235° C.

$C_{31}H_{32}N_8O_4$ (580.7).—Calculated (percent): N, 19.30. Found (percent): N, 19.50.

A solution of 75.0 g. of diphenylmethane diisocyanate in 200 ml. of acetone is added dropwise with cooling at 30° C. to a solution of 105 g. of 4-aminophenyl acetic acid methyl ester in 300 ml. of acetone. The deposit is filtered off under suction and dried. Yield 97%, M.P. 302 to 305° C.

$C_{33}H_{32}N_4O_6$ (580.6).—Calculated (percent): N, 9.65. Found (percent): N, 9.65.

(IV) Diphenyl ether-4,4'-bis-(urea acetic acid hydrazide)

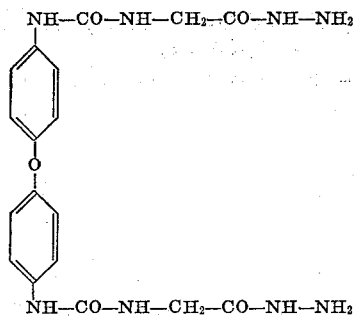

M.W.=430.4

37 g. of hydrazine hydrate are added dropwise at boiling temperature to a solution of 68.8 g. of diphenyl-ether-4,4'-bis-(urea acetic acid ethyl ester) in 250 ml. of pyridine, and the reaction mixture is kept at 100 to 102° C. for 1.5 hours. The urea hydrazide which crystallises out on cooling is filtered off under suction and washed thoroughly with alcohol. It is soluble in hot dimethyl formamide, yield 88%, M.P. 223° C.

$C_{18}H_{22}N_8O_5$ (430.4).—Calculated (percent): N, 26.04. Found (percent): N, 25.90.

A solution of 101.8 g. of diphenyl ether-4,4'-diisocyanate in 250 ml. of acetone is added dropwise at 20° C. (gentle cooling) to a solution of 94.0 g. of glycine ethyl ester in 300 ml. of acetone. The bis-urea ester is actually precipitated during the dropwise addition and the crystal paste formed is filtered off under suction and dried. The crude yield is 90%. Following recrystallisation, 2 ml./g. of toluene and 1.5 ml./g. of dimethyl formamide, the yield comprises 76%, M.P. 198° C.

$C_{22}H_{26}N_4O_7$ (458.5).—Calculated (percent): C, 57.64; H, 5.72; N, 12.22. Found (percent): C, 57.07; H, 5.70; N, 12.20.

(V) Diphenylethane-4,4'-bis-(urea acetic acid hydrazide)

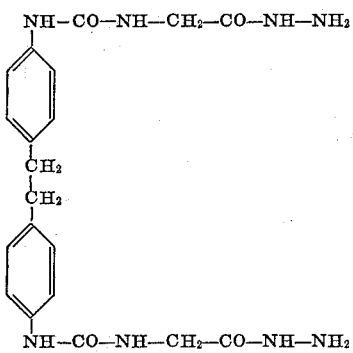

M.W.=442.5

50 g. of hydrazine hydrate are added dropwise at 115° C. to a solution of 94.5 g. of diphenylethane-4,4'-bis-(urea acetic acid ethyl ester) in 500 ml. of pyridine. After a reaction similar to (IV), the diphenylethane-4,4'-bis-(urea acetic acid hydrazide) is isolated in a yield of 70%, M.P. 208° C.

$C_{20}H_{26}H_8O_4$ (442.5).—Calculated (percent): N, 25.33. Found (percent): N, 24.70.

A solution of 163 g. of diphenylethane-4,4'-diisocyanate in 500 ml. of acetone (which has to be filtered) is added dropwise over a period of 30 minutes at room temperature to a solution of 154.0 g. of glycine ethyl ester in 300 ml. of acetone. The bis-urea ester is actually precipitated during the dropwise addition. The crude yield is 86%. Following recrystallisation from 2 ml./g. of dimethyl formamide and 1 ml./g. of toluene, the yield is 70%, M.P. 228° C.

$C_{24}H_{30}N_4O_6$ (470.5).—Calculated (percent): C, 61.26; H, 6.43; N, 11.91. Found (percent): C, 61.80; H, 6.40; N, 11.90.

(VI) Phenylene-1,4-bis-(urea acetic acid hydrazide)

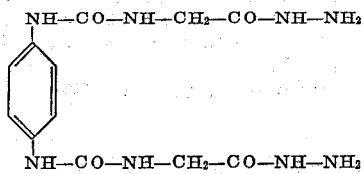

M.W.=338.8

66.0 g. of phenylene-1,4-bis-(urea acetic acid ethyl ester) are heated for 1.5 hours to 110 to 115° C. with 37 g. of hydrazine hydrate in 1.5 ml. of N-methyl pyrrolidone. On cooling, a thick swollen crystalline paste is formed which is filtered off under suction and washed repeatedly with alcohol. The bis-urea-dihydrazide is soluble (under heat) in N-methyl pyrrolidone. This solution can be diluted with methyl formamide. Yield 90%, M.P. 232° C.

$C_{12}H_{18}N_8O_4$ (338.3).—Calculated (percent): N, 33.12. Found (percent): N, 32.70.

82.5 g. of glycine ethyl ester are introduced into 300 ml. of acetone. A solution of 56.0 g. of 1,4-phenylene diisocyanate in 300 ml. of acetone (filtered) is added dropwise with cooling at 20° C. The urea ester deposit which precipitates immediately is filtered off under suction in a crude yield of 80% of the theoretical. After recrystallisation from 2 ml./g. of toluene and 2.5 ml./g. of dimethyl formamide, the yield falls to substantially 60%, M.P. 270° C.

$C_{16}H_{22}N_4O_6$ (366.4).—Calculated (percent): C, 52.45; H, 6.05; N, 15.29. Found (percent): C, 52.50; H, 6.30; N, 15.20.

(VII) Phenylene-1,3-bis-(urea acetic acid hydrazide)

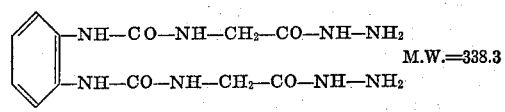

M.W.=338.3

60 g. of hydrazine hydrate are added dropwise at 115° C. to a solution of 88.0 g. of phenylene-1,3-bis-(urea acetic acid ethyl ester) in 400 ml. of pyridine, and the reaction mixture is maintained at 103 to 104° C. for 1.5 hours. The urea hydrazide actually begins to precipitate during the reaction, and is filtered off under suction after cooling and washed with alcohol. Yield 90%, M.P. 227° C.

$C_{12}H_{18}N_8O_4$ (338.3).—Calculated (percent): N, 33.12. Found (percent): N, 33.10.

As in (VI), 96.5 g. of glycine ethyl ester are reacted in acetone with 64.0 g. of 1,3-phenylene diisocyanate to form phenylene-1,3-bis-(urea acetic acid ethyl ester) in a yield of 82%. Recrystallisation from 2 ml./g. of toluene and 1.5 ml./g. of dimethyl formamide, M.P. 207° C.

(VIII) Ethylene-bis-(urea acetic acid hydrazide)

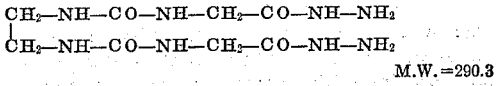

M.W.=290.3

A solution of 74.0 g. of ethylene-bis-(urea acetic acid ethyl ester) in 150 ml. of N-methyl pyrrolidone is run into 50 g. of hydrazine hydrate in 50 ml. of dioxan, and the reaction mixture kept at 100° C. for 1.5 hours. The urea hydrazide which is actually precipitated during the reaction is suction filtered after cooling and washed with methanol. Yield 87%, M.P. 231° C. $C_8H_{18}N_8O_4$ (290.3)

15.0 g. of ethylene diamine in 50 ml. of acetone are added dropwise at 20° C. (gentle cooling) to a solution of 69.0 g. glycine ethyl ester isocyanate in 200 ml. of acetone. The urea ester is precipitated during the dropwise addition and the white crystallisate is filtered off under suction and dried. Yield 95%, M.P. 185° C.

C₁₂H₂₂B₄O₆ (318.3).—Calculated (percent): N, 17.60. Found (percent): N, 17.70.

(IX) Hexamethylene-bis-(urea acetic acid hydrazide)

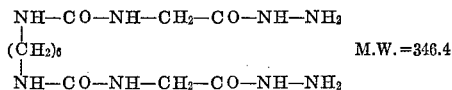

M.W.=346.4

80.4 g. of hexamethylene-bis-(urea acetic acid ethyl ester) are dissolved at an elevated temperature in 150 ml. of N-methyl pyrrolidone. This solution is run in to an almost boiling solution of 50 g. of hydrazine hydrate in 75 ml. of dioxan. The reaction mixture is kept at 100° C. for 1 hour. A deposit begins to form only 3 minutes after the bis-urea ester solution has been added. After cooling, the crude dihydrazide is filtered off under suction and washed thoroughly with alcohol. Yield 85%, M.P. 212° C. C₁₂H₂₀N₈O₄ (346.4).

A solution of 104 g. of hexamethylene-1,6-diisocyanate in 300 ml. of acetone is added dropwise at 25° C. to a solution of 135 g. of glycine ethyl ester in 50 ml. of acetone. The hexamethylene-bis-(urea acetic acid ethyl ester) is precipitated and filtered off under suction. Yield 80%, M.P. 168° C.

C₁₆H₃₀N₄O₆ (374.5).—Calculated (percent): C, 51.32; H, 8.08; N, 14.62. Found (percent): C, 51.70; H, 8.10; N, 14.70.

(X) Diphenylmethane-4,4'-bis-(urea benzoic acid hydrazide)

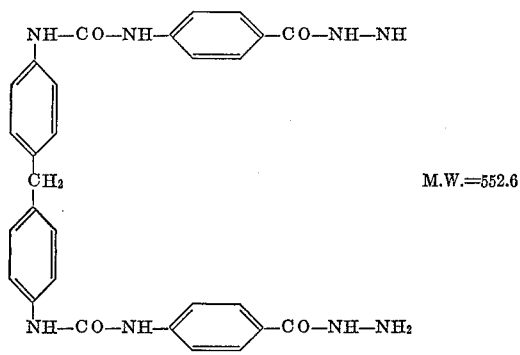

M.W.=552.6

A solution heated to 90° C. of 135 g. of diphenylmethane-4,4'-bis-(urea benzoic acid phenyl ester) in 700 ml. of N-methyl pyrrolidone is run into 40 g. of hydrazine hydrate in 50 ml. of N-methyl pyrrolidone, and the reaction mixture is kept at 100° C. for 30 minutes. The urea hydrazide crystallises in a highly swollen form on cooling so that the reaction mixture solidifies like an ointment. To convert the bis-urea hydrazine into a filterable form, it is diluted wtih 2.5 litres of methanol. The crude product filtered off under suction is re-washed with methanol. Yield 80%, M.P. 276° C.

C₂₉H₂₈N₈O₄ (525.6).—Calculated (percent): C, 63.03; H, 5.11. Found (percent): C, 63.30; H, 5.40.

50.0 g. of diphenylmethane-4,4'-diisocyanate dissolved in 100 ml. of dioxan are added at 40° C. to a solution of 90.0 g. of 4-aminobenzoic acid phenyl ester in 300 ml. of dimethyl acetamide. After the diisocyanate has been added, the reaction mixture is heated for 30 minutes to 80° C. In order to isolate the bis-urea phenyl ester, the cooled solution is added dropwise to ice water. The deposit is filtered off under suction and washed thoroughly with water. Yield substantially quantitative, M.P. 300° C.

C₄₁H₃₂N₄O₆ (676.7).—Calculated (percent): C, 72.77; H, 4.77; N, 8.28. Found (percent): C, 72.60; H, 5.10; N, 8.40.

The dihydrazides of terephthalic acid, isophthalic acid, adipic acid and 4,4' - diphenylethane dicarboxylic acid used in the comparison examples are known from the literature. 1,4-phenylene diacetic acid hydrazide is described in Belgian Pat. No. 755 134.

Comparison tests

The following structurally related dihydrazides are used for comparison: terephthalic acid dihydrazide (a), isophthalic acid dihydrazide (b), 1,4-phenylene diacetic acid hydrazide (c), adipic acid dihydrazide (d), 4,4'-diphenyl ether carboxylic acid hydrazide (e) and the carbodihydrazide (f) preferably used as chain extender for elastomeric filaments.

Comparison test (a)

7.50 g. of terephthalic acid dihydrazide are dissolved at 90° C. in 370 g. of dimethyl sulphoxide (the solubility of the terephthalic acid dihydrazide in dimethyl formamide is too low). 200 g. of the NCO prepolymer solution of Example 2 (1.53% NCO) are then added with thorough stirring at 60° C. A highly viscous elastomer solution with a concentration of 21.1% is formed. After pigmenting with titanium dioxide, the elastomer solution is converted into filaments and films. The properties of the filaments are set out in Table I.

Comparison test (b)

6.10 g. of isophthalic acid dihydrazide (105%, based on the NCO content of the NCO prepolymer solution) are dissolved at 85° C. in 325 g. of dimethyl formamide. 200 g. of the NCO prepolymer solution according to Example 4 (1.25% NCO) are stirred in at 30° C. The elastomer solution formed has a viscosity of 108 p/20° C. The viscosity rises to 330 p/20° C. following the addition of 1.0 ml. of a 10% solution of hexane diisocyanate in chlorobenzene. The elastomer solution is converted into filaments and films, M.P. 216 to 220° C. The properties of the filaments are set out in Table I.

Comparison test (c)

8.15 g. of 1,4-phenylene diacetic acid hydrazide are dissolved in 325 g. of dimethyl formamide at 115 to 120° C. 200 g. of the NCO prepolymer solution of Example 1 (1.45% NCO) are stirred at 65° C. into the solution of the chain extender. The 22.5% elastomer solution has a viscosity of 226 poises at 20° C. It is converted into filaments and films, M.P. 218 to 222° C. The properties of the filaments are set out in Table I.

Comparison test (d)

5.50 g. of adipic acid dihydrazide are dissolved in 300 g. of dimethyl formamide. 200 g. of the NCO prepolymer solution of Example 4 (1.25% NCO) are run into this solution at 30° C., resulting in the formation of a homogeneous clear elastomer solution with a viscosity of 338 poises at 20° C. The solution is converted into filaments and films in the usual way. As can be seen from Table I (Comparison tests), the elastomers extended with adipic acid dihydrazide, although showing good elastic properties, show poor thermal properties (HDT) and highly unsatisfactory hydrothermal properties.

Comparison test (e)

8.90 g. of 4,4'-diphenyl ether dicarboxylic acid hydrazide are dissolved in 275 g. of dimethyl formamide. 200 g. of the NCO prepolymer solution of Example 4 (1.25% NCO) are run into this solution at 45° C., resulting in the formation of a viscous elastomer solution with a viscosity that is too high for solution spinning. The elastomer is degraded by heating the solution for 2 hours to 80° C. so that its viscosity falls to 480 poises at 20° C., after which it can be converted into filaments and films in the usual way. The properties of the filaments are set out in Table I.

Comparison test (f)

3.30 g. of carbodihydrazide are dissolved at 70° C. in 320 g. of dimethyl formamide. 200 g. of the NCO prepolymer solution of Example 1 (1.45% NCO) are run into this solution with thorough stirring. The viscous elastomer solution formed then has 3.0 ml. of a 10% solu-

TABLE I.—COMPARISON EXAMPLES

| Example No. | Spinning process | Elastic properties | | | | | Thermal and hydrothermal properties | | | | | Remarks: behaviour in n/20 CuSO₄ solution (ammoniacal) |
|---|---|---|---|---|---|---|---|---|---|---|---|---|
| | | Tensile strength (g./dtex) | Breaking elongation (percent) | Modulus 300% (mg./dtex) | Modulus 150% 3rd recovery curve (mg./dtex) | Permanent elongation after 3×300% (percent) | HDT (° C.) | HWDT | | HWE | | |
| | | | | | | | | Tension in air at 20° C. (mg./dtex) | Tension in water at 95° C. (mg./dtex) | Residual elongation after hydro-thermal stressing (percent) | Elongation in air at 20° C. (percent) | Elongation in water at 95° C. (percent) | Residual elongation after relaxation in air at 20° C. (percent) | |
| a | W<br>D | 0.23<br>0.24 | 380<br>690 | 192<br>85 | 12<br>11 | 45<br>44 | 141 | | | | | | Dirty grey. |
| b | W<br>D | 0.70<br>0.79 | 488<br>514 | 117<br>72 | 11<br>16 | 15<br>15 | 127 | 29.1 | 6.6 | 69 | 98 | Failure | 116 | Colourless. |
| c | W<br>D | 0.66<br>0.72 | 432<br>480 | 175<br>97 | 19<br>16 | 23<br>21 | 129 | 41.2 | 16.5 | 49 | 52 | 220 | 302 | Do. |
| d | W<br>D | 0.60<br>0.79 | 444<br>445 | 123<br>71 | 18<br>16 | 14<br>18 | 128 | 29.5 | 8.5 | 78 | 102 | 572 | | Do. |
| e | W<br>D | 0.70<br>0.66 | 459<br>454 | 141<br>100 | 17<br>17 | 19<br>17 | 119 | 32.2 | 9.4 | 62 | 92 | Failure | | Do. |
| f | W<br>D | 0.67<br>0.67 | 540<br>550 | 101<br>95 | 19<br>19 | 16<br>13 | 145 | 32.2 | 10.4 | 50 | 44 | 354 | 142 | Reddish brown. | tion of 1,6-hexane diisocyanate in dioxan added to it in order further to increase its viscosity. The 22.4% solution is pigmented with 4% of titanium dioxide, after which its viscosity is 520 p/20° C. The solution is then spun as in Example 1. The test results are set out in Table I. The filaments turn dark reddish-brown in colour following treatment with an ammoniacal n-20 copper sulphate solution.

EXAMPLE 1

Following dehydration in vacuo at 130° C., 800 g. of an adipic acid mixed polyester with hexane-1,6-diol and 2,2-dimethyl propane-1,3-diol (molar ratio of the glycols 65:35; RZ=66.0) are heated for 60 minutes to 100° C. with 16.0 g. of N,N'-bis-(β-hydroxypropyl)-methylamine and 228.0 g. of diphenylmethane-4,4'-diisocyanate. The NCO prepolymer melt is dissolved in 800 g. of chlorobenzene. The solution has an NCO content of 1.45%=96.7% of the theoretical or 2.48%, based on the solids content.

62.0 g. of diphenylmethane-4,4'-bis-(urea acetic acid hydrazide) (I) are dissolved in 1280 g. of dimethyl formamide at 115 to 120° C. 800 g. of the NCO prepolymer solution are stirred into the solution cooled to 60° C., resulting in the formation of a viscous solution of the polyurethane elastomer. The solution is converted into films by the general process described in the foregoing and wet and dry spun into filaments. The elastomer has a viscosity of η=1.22, as measured in hexamethyl phosphoramide at 25° C. The properties of the filaments are set out in Table II.

EXAMPLE 2

800 g. of the mixed polyester described in Example 1 and 16.0 g. of N,N-bis-(β-hydroxypropyl)-methylamine are heated for 3 hours to 100° C. with 232.8 g. of diphenylmethane diisocyanate in 800 g. of dioxan. The NCO prepolymer solution has an NCO content of 1.53%=96.0% of the theoretical, or 2.71%, based on the solids content.

66.0 g. of diphenylmethane-4,4'-bis-urea acetic acid hydrazide) (I) are dissolved in 1435 g. of dimethyl formamide at 115 to 120° C.

800 g. of the NCO prepolymer solution in dioxan are stirred into the solution of the chain extender cooled to 60° C. The viscous solution of the elastomer formed has 12.0 ml. of a 10% solution of hexane-1,6-diisocyanate added to it in order to increase its viscosity. The 22.5% solution, which has a viscosity of 187 p/20° C., is dry spun after pigmenting with a 33% rutile paste. The TiO₂ content amounts to 4%, based on the solids content of the elastomer. In addition, films are cast and then cut into filaments. The properties of the filaments are set out in Table II.

EXAMPLE 3

800 g. of the mixed polyester described in Example 1 and 16.0 g. of N,N-bis-(β-hydroxypropyl)-methylamine are heated for 90 minutes to 95° C. with 204.0 g. of diphenylmethane-4,4'-diisocyanate. The NCO prepolymer melt is dissolved in 340 g. of dioxan so that a 75% solution is formed. The solution has an NCO content of 1.42%=97.2% of the theoretical or 1.88%, based on the solids content.

92.0 g. of diphenylmethane-4,4'-bis-(urea acetic acid hydrazide) (I), corresponding to 106%, based on the NCO prepolymer used, are dissolved in 2700 g. of dimethyl formamide. 1200 g. of the 75% NCO prepolymer solution corresponding to an NCO content of 17.0 g. are stirred into this solution at 60° C. The elastomer solution formed has a concentration of 26.9%. Its viscosity is increased to 616 p/20° C. by the addition of 18.0 ml. of a 10% solution of hexane diisocyanate in chlorobenzene. After pigmenting with rutile paste (4% TiO₂ based on the elastomer content), the elastomer solution is cast into films and dry spun into filaments. The properties of the filaments are set out in Table II.

TABLE II

Thermal and hydrothermal properties

| | | Elastic properties | | | | | | HWDT | | | HWE | | | Remarks; behaviour in n/20 CuSO₄ solution (ammoniacal) |
|---|---|---|---|---|---|---|---|---|---|---|---|---|---|---|
| Example No. | Spinning process | Tensile strength (g./dtex) | Breaking elongation (percent) | Modulus 300% (mg./dtex) | Modulus 150% 3rd recovery curve (mg./dtex) | Permanent elongation after 3×300% (percent) | HDT (°C.) | Tension in air at 20°C. (mg./dtex) | Tension in water at 95°C. (mg./dtex) | Residual elongation after hydro-thermal stressing (percent) | Elongation in air at 20°C. (percent) | Elongation in water at 95°C. (percent) | Residual elongation after relaxation in air at 20°C. (percent) | |
| 1 | W | 0.61 | 488 | 170 | 17 | 36 | 160.5 | 45.7 | 17.6 | 54 | 64 | 236 | 100 | Colourless. |
| | F | 0.61 | 480 | 149 | 17 | 24 | | | | | | | | |
| | D: V 0 | 0.54 | 408 | 152 | 16 | 30 | | | | | | | | |
| | V30 | 0.62 | 386 | 217 | 17 | 32 | | | | | | | | |
| | V50 | 0.63 | 342 | 270 | 20 | 35 | | | | | | | | |
| 2 | W | 0.54 | 494 | 175 | 16 | 35 | 171.5 | 44.9 | 20.7 | 49 | 36 | 152 | 84 | Do. |
| | F | 0.66 | 503 | 155 | 16 | 32 | | | | | | | | |
| | D: V 0 | 0.50 | 388 | 149 | 16 | 28 | | | | | | | | |
| | V30 | 0.57 | 361 | 216 | 17 | 29 | | | | | | | | |
| | V50 | 0.64 | 338 | 253 | 19 | 31 | | | | | | | | |
| 3 | W | 0.67 | 562 | 101 | 18 | 16 | 160 | | | | | | | |
| | D: V 0 | 0.53 | 428 | 105 | 16 | 16 | | 31.0 | 14.5 | 53 | 92 | 280 | 136 | Do. |
| | V30 | 0.58 | 384 | 122 | 18 | 18 | | 46.4 | 22.0 | 53 | 66 | 148 | 68 | |
| | V50 | 0.61 | 376 | 147 | 18 | 22 | | 51.7 | 23.3 | 55 | 68 | 146 | 64 | |
| | V70 | 0.64 | 364 | | | 19 | | | | | | | | |
| | V100 | 0.69 | 356 | 199 | 22 | | | | | | | | | |

EXAMPLE 4

800 g. of the mixed polyester described in Example 1 and 16.0 g. of N,N-bis-(β-hydroxypropyl)-methylamine are heated for 120 minutes to 100° C. with 215.2 g. of diphenylmethane diisocyanate. The NCO polymer melt is then dissolved in 800 g. of chlorobenzene. The NCO prepolymer solution has an NCO content of 1.25% =97.8% of the theoretical, or 2.24% NCO, based on the solids content.

14.4 g. of diphenylmethane-4,4'-bis-(urea propionic acid hydrazide) (II) are dissolved at 150° C. in 320 g. of dimethyl formamide. 200 g. of the NCO prepolymer solution are stirred into the solution of the chain extender cooled to 50° C. The excess of the chain extender comprises 6%. The viscous elastomer solution is pigmented with a rutile paste (one-third rutile, one-third dimethyl formamide and one-third elastomer solution), so that the solution contains 4% of $TiO_2$, based on the solids content. The solution is then cast into films and wet spun into filaments. The properties of the filaments are set out in Table III.

EXAMPLE 5

21.0 g. of diphenylmethane-4,4'-bis-(urea phenyl acetic acid hydrazide) (III) are dissolved in 370 g. of dimethyl formamide at 135° C. 200 g. of the NCO prepolymer solution of Example 1 (1.45% NCO) are stirred into the solution of the chain extender at 60° C. 2.0 ml. of a 10% solution of diphenylmethane-4,4'-diisocyanate chlorobenzene are added to the viscous elastomer solution to increase its viscosity, after which the solution is pigmented with a rutile paste containing 4% of $TiO_2$, based on the elastomer substance. The solution is cast into films and wet spun into filaments. The properties of the filaments are set out in Table III.

EXAMPLE 6

300 g. of a polyhydroxy carbonate of ω-hydroxy caproic acid-ω'-hydroxyhexyl ester and diphenyl carbonate with an OH number of 65 (MW. 1730) are heated for 60 minutes to 100° C. with 72.0 g. of diphenylmethane-4,4'-diisocyanate. The NCO prepolymer melt is dissolved in 300 g. of methyl ethyl ketone. The solution has an NCO content of 1.35%, corresponding to 94.4% of the theoretical, or 2.43% NCO, based on the solids content.

(A) 13.5 g. of diphenylmethane-4,4'-bis-(urea acetic acid hydrazide) (I) and 0.50 g. of 4,4'-diamino diphenylmethane are dissolved at 130° C. in 350 g. of dimethyl formamide. 200 g. of the NCO prepolymer solution are run in at 50° C. with thorough stirring. The elastomer solution (21.9%) is cast into films and wet spun into filaments. The filaments have a softening point of from 238 to 242° C. Their properties are set out in Table III.

(B) As in (A) 13.5 g. of diphenylmethane-4,4'-bis-(urea acetic acid hydrazide) (I) and 0.40 g. of β-semicarbazido propionic acid hydrazide (prepared as in P 17 70 591.8) are dissolved in 350 g. of dimethyl formamide at 130° C., and reacted with 200 g. of NCO prepolymer solution at 50° C. The viscous elastomer solution (21.8%, 59 p) is cast into films and wet spun into filaments. The softening point is 240 to 242° C. The properties of the filaments are set out in Table III.

(C) 13.5 g. of diphenylmethane-4,4'-bis-(urea acetic acid hydrazide) (I) are dissolved in 350 g. of dimethyl formamide at 130° C. A solution of 0.60 g. of N,N'-urea dipropionic acid hydrazide (prepared as in P 19 52 394.5) in 5 g. of water is added to this solution at 80° C., after which 200 g. of the NCO prepolymer solution are stirred at 50° C. into the solution of the two chain extenders. The viscous elastomer solution (21.3%, 62 p.) is cast into films and spun into filaments. Softening point: 242 to 244° C. The properties of the filaments are set out in Table III.

EXAMPLE 7

After drying (for 1 hour in vacuo at 130° C.), 100 g. of a polytetramethyl glycol ether with an OH number of 57.0 (molecular weight 1970) are heated for 60 minutes to 100° C. with 2.0 g. of N,N'-bis-(β-hydroxypropyl)-methylamine and 25.0 g. of diphenylmethane-4,4'-diisocyanate. The NCO prepolymer melt is dissolved in 100 g. of glycol monomethyl ether acetate. The solution has an NCO content of 1.31%, corresponding to 99.2% of the theoretical, or 2.34%, based on the solids content. 14.1 g. of diphenylmethane-4,4'-bis-(urea acetic acid hydrazide) (I) are dissolved at 110° C. in 325 g. of dimethyl acetamide. 200 g. of the NCO prepolymer solution are stirred in at 55° C. The viscous elastomer solution (23.9%, 474 p.) is cast into films and spun into filaments softening at 250 to 254° C. The properties of the filaments are set out in Table III.

EXAMPLE 8

13.0 g. of diphenyl ether-4,4'-bis-(urea acetic acid hydrazide) (IV) are dissolved at 150° C. in 320 g. of dimethyl formamide. 200 g. of an NCO prepolymer solution prepared in accordance with Example 4 are stirred in at 50 to 55° C. The solution has an NCO content of 1.20%, corresponding to 2.14% of NCO, based on the solids content. The viscous elastomer solution (23.8%, 137 p.) is cast into films and, following dilution to 20%, is spun into filaments (by wet spinning). The properties of the filaments are set out in Table III.

EXAMPLE 9

13.6 g. (107% of the calculated quantity) of diphenylethane-4,4'-bis-(urea acetic acid hydrazide) (V) are dissolved at 130° C. in 320 g. of dimethyl acetamide. As in Example 8, 200 g. of an NCO prepolymer solution prepared in accordance with Example 4 and stirred in at 50° C. The prepolymer solution has an NCO content of 1.20%, corresponding to 2.14% of NCO, based on the solids content. The viscous elastomer solution (24.9%, 44 p.) is cast into films and, following dilution to 20% is spun into filaments. The properties of the filaments are set out in Table III.

EXAMPLE 10

10.2 g. of phenylene-1,4-bis-(urea acetic acid hydrazide) (VI) are dissolved at 180 to 185° C. in 220 g. of N-methyl pyrrolidone. This solution is diluted with 100 g. of dimethyl formamide. 200 g. of NCO prepolymer (prepared as in Example 4) with an NCO content of 1.20% are stirred in at 140° C. The viscous elastomer solution (23.3%, 135 p.) is converted into films and filaments in the usual way. The properties of the filaments are set out in Table III.

EXAMPLE 11

10.2 g. of phenylene-1,3-bis-(urea acetic acid hydroxide) (VIII) are dissolved in 120 g. of dimethyl sulphoxide at 140° C. After this solution has been diluted with 200 g. of dimethyl formamide, 200 g. of NCO prepolymer (prepared as in Example 4) with an NCO content of 1.20% are stirred in at 90° C. The viscous elastomer solution (23.3%, 55 p.) is converted into films and filaments in the usual way. The properties of the filaments are set out in Table III.

EXAMPLE 12

8.80 g. of ethylene-bis-(urea acetic acid hydrazide) (VIII) are dissolved at 100° C. in a solution of 16.0 g. of lithium chloride in 320 g. of dimethyl formamide. After the extender solution has been cooled to 45° C., 200 g. of NCO prepolymer solution (prepared as in Example 4) with an NCO content of 1.20% are stirred in. The viscous elastomer solution is wet spun into filaments which are freed from LiCl by treatment with water for 2 hours at 50° C. The properties of the filaments are set out in Table III.

EXAMPLE 13

10.4 g. of hexane-1,6-bis(urea acetic acid hydrazide) (IX) are dissolved at 120° C. in 320 g. of dimethyl acetamide. After cooling to 80° C., 200 g. of the NCO prepolymer solution (prepared as in Example 4) with an NCO content of 1.20% are stirred in. The viscous elastomer solution (23.4%, 49 p.) is converted into films and filaments. The properties of the filaments are set out in Table III.

EXAMPLE 14

16.8 g. of diphenylmethane-4,4'-bis-(urea benzoic acid hydrazide) (X) are dissolved at 100 to 110° C. in 120 g. of formamide. After this solution has been diluted with 200 g. of dimethyl acetamide, 200 g. of NCO prepolymer solution are stirred into the chain extender solution. The viscous elastomer solution is then diluted to 20% with 120 g. of dimethyl formamide, viscosity 101 p./20° C., and converted into films and filaments. The filaments have a softening point of from 250 to 252° C. Their properties are set out in Table III.

TABLE III

Thermal and hydrothermal properties

| Example No. | Spinning process | Elastic properties | | | | | HWDT | | | HWE | | | Remarks: behaviour in n/20 CuSO4 solution (ammoniacal) |
|---|---|---|---|---|---|---|---|---|---|---|---|---|---|
| | | Tensile strength (g./dtex) | Breaking elongation (percent) | Modulus 300% (mg./dtex) | Modulus 150% 3rd recovery curve (mg./dtex) | Permanent elongation after 3×300% (percent) | HDT (° C.) | Tension in air at 20° C. (mg./dtex) | Tension in water at 95° C. (mg./dtex) | Residual elongation after hydrothermal stressing (percent) | Elongation in air at 20° C. (percent) | Elongation in water at 95° C. (percent) | Residual elongation after relaxation in air at 20° C. (percent) | |
| 4 | N | 0.62 | 639 | 94 | 16 | 18 | 159 | 33.6 | 12.4 | 52 | 72 | 378 | 178 | Colourless. |
| 5 | N | 0.58 | 511 | 154 | 15 | 28 | 171 | 39.5 | 14.9 | 64 | 30 | | | Do. |
| | F | | | | | | | | | | | | | |
| 6A | N | 0.63 | 507 | 152 | 16 | 26 | 163 | 35.2 | 18.3 | 43 | 68 | 258 | 130 | Do. |
| | F | 0.63 | 562 | 125 | 15 | 25 | | | | | | | | |

TABLE III—Continued

| Example No. | Spinning process | Elastic properties | | | | | HWDT | | | | HWE | | Remarks: behaviour in n/20 CuSO4 solution (ammoniacal) |
|---|---|---|---|---|---|---|---|---|---|---|---|---|---|
| | | Tensile strength (g./dtex) | Breaking elongation (percent) | Modulus 300% (mg./dtex) | Modulus 150% 3rd recovery curve (mg./dtex) | Permanent elongation after 3X 300% (percent) | HDT (°C.) | Tension in air at 20° C. (mg./dtex) | Tension in water at 95° C. (mg./dtex) | Residual elongation after hydro-thermal stressing (percent) | Elongation in air at 20° C. (percent) | Elongation in water at 95° C. (percent) | Residual elongation after relaxation in air at 20° C. (percent) | |
| 6B | N<br>F | 0.60<br>0.74 | 480<br>545 | 161<br>135 | 15<br>16 | 29<br>24 | 160 | 36.8 | 17.1 | 50 | 62 | 208 | 108 | Colorless. |
| 6C | N<br>F | 0.62<br>0.74 | 506<br>531 | 154<br>141 | 15<br>16 | 28<br>24 | 159 | 35.1 | 16.2 | 49 | 62 | 284 | 142 | Do. |
| 7 | N<br>F | 0.62<br>0.82 | 678<br>650 | 157<br>153 | 18<br>20 | 30<br>17 | 175 | 45.0 | 20.9 | 30 | 44 | 120 | 64 | Do. |
| 8 | N<br>F | 0.57<br>0.64 | 568<br>525 | 131<br>118 | 18<br>20 | 20<br>19 | 162 | 34.2 | 16.3 | 43 | 74 | 256 | 130 | Do. |
| 9 | N<br>F | 0.60<br>0.72 | 592<br>622 | 120<br>105 | 15<br>16 | 24<br>22 | 156 | 34.2 | 14.4 | 50 | 66 | 422 | 222 | Do. |
| 10 | N<br>F | 0.66<br>0.60 | 639<br>514 | 117<br>103 | 16<br>18 | 20<br>21 | 158 | 33.3 | 11.1 | 54 | 58 | ---- | ---- | Do. |
| 11 | N<br>F | 0.68<br>0.69 | 555<br>538 | 135<br>112 | 20<br>19 | 19<br>18 | 158 | 38.1 | 15.8 | 49 | 68 | ---- | ---- | Do. |
| 12 | N | 0.59 | 437 | 144 | 19 | 18 | 158 | 52.7 | 21.3 | 42 | 44 | 168 | 82 | Do. |
| 13 | N<br>F | 0.42<br>0.50 | 629<br>623 | 98<br>72 | 13<br>16 | 21<br>23 | 152 | 30.4 | 10 | 44 | 88 | 448 | 216 | Do. |
| 14 | N<br>F | 0.63<br>0.66 | 446<br>510 | 202<br>163 | 14<br>14 | ---- | 150 | 47 | 11.2 | ---- | 36 | 276 | 190 | Do. |

What we claim is:

1. A linear segmented polyurethane elastomer consisting of the reaction product of a relatively high molecular weight diisocyanate with chain extenders, containing at least 55%, based on the total number of chain extending segments present, of a chain extending segment with the structure:

—NH—CO—NH—NH—CO—R—NH—CO—NH—R′
—NH—CO—NH—R—CO—NH—NH—CO—NH— in which

R represents —(CH$_2$)$_x$ or

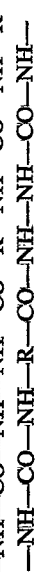

R′ represents —(CH$_2$)$_x$,

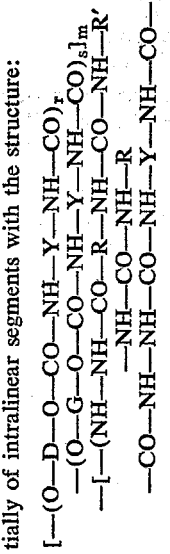

or

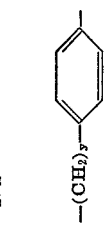

x represents 1 or 2,
y represents 0, 1 or 2,
z represents 2 or 6, and
X represents —CH$_2$—, —(CH$_2$)$_2$— or —O—.

2. A linear segmented polyurethane elastomer with a breaking elongation of more than 300% and an inherent viscosity of at least 0.5, as measured on a 1% solution in hexamethyl phosphoramide at 25° C., consisting essentially of intralinear segments with the structure:

[—(O—D—O—CO—NH—Y—NH—CO)$_r$—
—(O—G—O—CO—NH—Y—NH—CO)$_{s}$]$_m$
—[—(NH—NH—CO—R—NH—CO—NH—R′
—NH—CO—NH—R
—CO—NH—NH—Y—NH—CO—)—]$_n$ in which
D represents a long chain divalent aliphatic polymer radical of a relatively high molecular weight polyhydroxyl compound with a molecular weight of from 500 to 6000 and a melting point of below 60° C.,
Y represents a divalent organic radical of an aromatic, aliphatic, cycloaliphatic or araliphatic diisocyanate,
G represents a divalent aliphatic, cycloaliphatic or araliphatic radical of a dialcohol with a molecular weight of from 62 to 300, optionally containing one or more tertiary aliphatic amino groups, $m$ is an integer of from 1 to 5,
$n$ is an integer from 1 to 5,
$r$ is an integer from 1 to 5, and
$s$ is 0 or an integer from 1 to 5, and
R and R' are as defined in claim 1.

3. A highly elastic polyurethane elastomeric filament with a breaking elongation of at least 300% and a heat distortion temperature above 145° C., consisting of a linear segmented polyurethane elastomer with an inherent viscosity of at least 0.5 as measured on a 1% by weight solution in hexamethyl phosphoramide at 25° C., comprising intra-linear segments of the structure:

[—(O—D—O—CO—NH—Y—NH—CO)$_r$—(—O—G—O—NH—Y—NH—CO)$_s$]$_m$—[—NH—NH—CO—R—NH—CO—NH—R'—NH—CO—NH—R—CO—NH—NH—CO—NH—Y—NH—CO—]$_n$ in which D, Y, G, R, R', $m$, $n$, $r$, and $s$ are as defined in claim 2.

4. A solution of a polyurethane elastomer consisting of a highly polar aliphatic solvent with amide, urea or sulphoxide groups and a boiling point of up to 225° C., from 10 to 33% by weight, based on the solution, of a substantially linear segmented polyurethane with intra-linear chain extending segments of the structure:

—NH—CO—NH—NH—CO—R—NH—CO—NH—R'—NH—CO—NH—R—CO—NH—NH—CO—NH— in which R and R' are as defined in claim 1.

References Cited
UNITED STATES PATENTS

| | | | |
|---|---|---|---|
| 3,432,456 | 3/1969 | Oertel et al. | 260—30.2 |
| 3,499,872 | 3/1970 | Thoma et al. | 260—75 |
| 3,536,663 | 10/1970 | Oertel et al. | 260—47 |

DONALD E. CZAJA, Primary Examiner

H. S. COCKERAM, Assistant Examiner

U.S. Cl. X.R.

260—30.8, 32.4, 32.6, 77.5 SP, 553 R

UNITED STATES PATENT OFFICE
CERTIFICATE OF CORRECTION

Patent No. 3,711,443                    Dated January 16, 1973

Inventor(s) Wilhelm Thomas et al

It is certified that error appears in the above-identified patent and that said Letters Patent are hereby corrected as shown below:

Column 4, line 50, "-HN-" should read --- -NH- ---.

Column 5, line 13, "H2H" should read ---$H_2N$---.

Column 7, line 12, "-$CH_2$-$CH_3$-N-" should read --- -$CH_2$-$CH_2$-N- ---.

Column 14, line 17, "$\overset{|}{\underset{|}{CH}}$" should read --- $\overset{|}{\underset{|}{CH_2}}$ ---.

Column 15, line 42, "57.07" should read ---57.70---.

Column 15, line 67, "$H_8$" should read ---$N_8$---.

Column 16, line 11, "M.W.=338.8" should read ---M.W.=338.3---.

Column 17, line 32, "NH-NH" should read ---NH-$NH_2$---.

Column 27, line 15, "(O-GO-NH-" should read -- (O-G-O-NH- --.

Signed and sealed this 7th day of January 1975.

(SEAL)
Attest:

McCOY M. GIBSON JR.
Attesting Officer

C. MARSHALL DANN
Commissioner of Patents